Patented Nov. 25, 1952

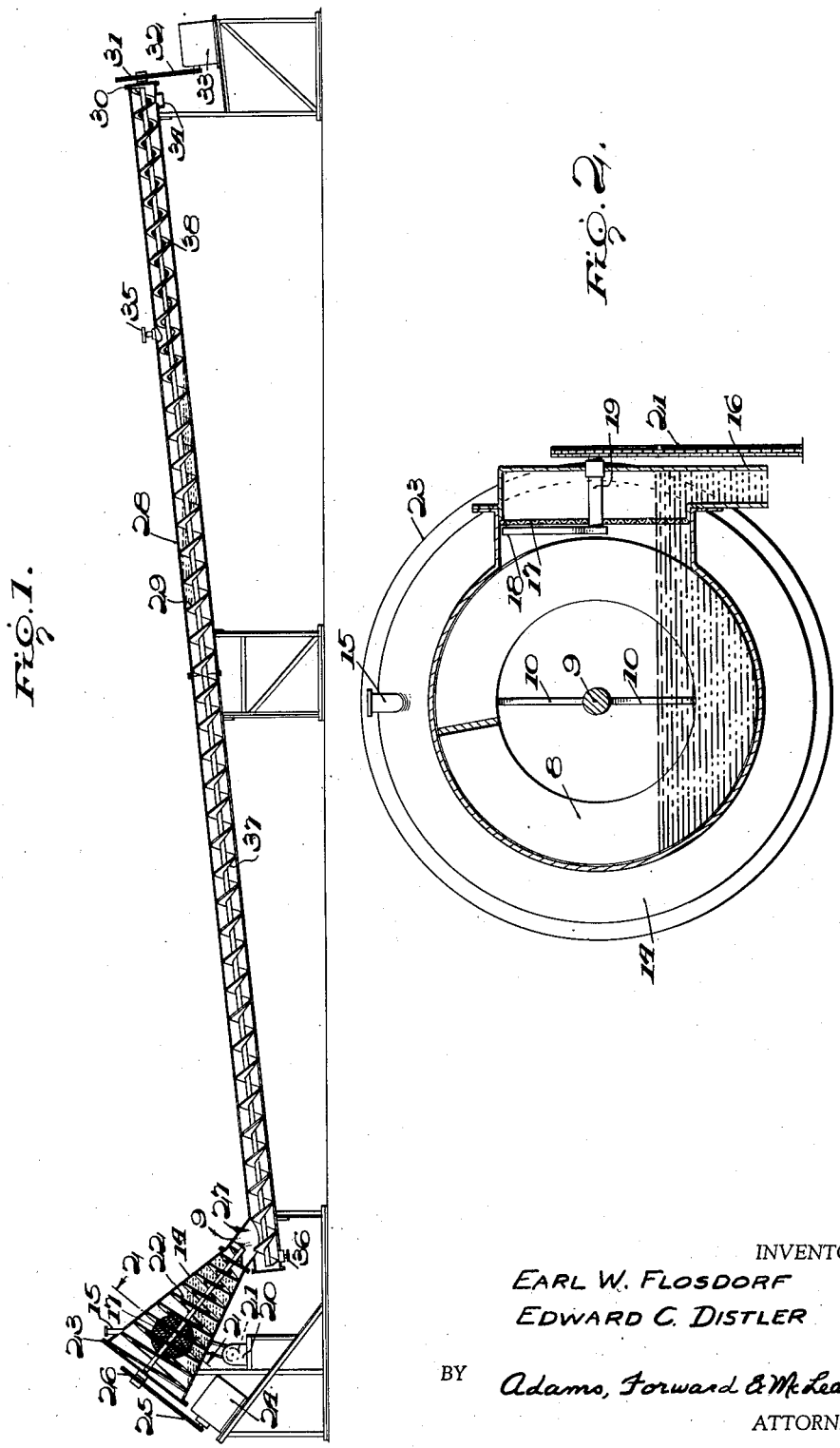

2,619,024

UNITED STATES PATENT OFFICE 2,619,024

EXTRACTOR

Earl W. Flosdorf, Forest Grove, and Edward C. Distler, Philadelphia, Pa., assignors to F. J. Stokes Machine Company, Philadelphia, Pa., a corporation of Pennsylvania Application November 1, 1950, Serial No. 193,346

6 Claims. (Cl. 99—289)

This invention relates to a new and improved apparatus adapted for the continuous countercurrent solvent extraction of solid materials. More particularly, this invention relates to a novel extractor capable of removing soluble constituents from finely-divided material in an economical manner.

The methods and apparatus heretofore employed for the continuous solvent extraction of finely-divided material have not proved to be highly successful because of the handling problem peculiar to this type of material. Paramount of these problems is the preparation of the material for the continuous extraction operation.

This preparation includes the initial wetting of each particle of the finely-divided material which has proved to be exceedingly difficult due to the surface tension of the solvent and the formation of lumps of dry material which tend to clog the apparatus. The present invention overcomes this problem by the provision of a conical hopper into which is fed the finely-divided material. The extracting chamber is arranged in a manner such that the solvent flows from the chamber upwardly into the hopper and is discharged therefrom, the hopper being inclined from the vertical to provide a larger surface area of extract-containing solvent or lixivium than would be available were the hopper in the vertical position. The particles of finely-divided material introduced into the hopper float on the surface and are agitated by a floating conical ribbon screw. As the particles become wet, they gravitate downwardly and are moved into the extraction zone of the extracting chamber by the ribbon of the conical screw. In this manner, only the particles which have overcome the surface tension of the lixivium are removed from the wetting zone in the conical hopper. As the particles are moved downwardly in the conical hopper, they pass from a condition of relatively low concentration to a condition of concentration which is optimum for the continuous extraction process. This passage from a rarified condition to a concentrated condition is accompanied by agitation of the particles by the conical ribbon screw thereby insuring the complete wetting of each individual particle.

It is, therefore, an object of this invention to provide an apparatus which allows the newly introduced finely-divided material to become wetted prior to any substantial movement through the solvent thereby insuring optimum extraction conditions.

Another object is the provision of an apparatus wherein a conical-shaped wetting zone is aligned with a tubular-shaped extracting and drainage zone in a manner such that the movement of the finely-divided material therethrough is without radical changes in direction.

Still another object of the present invention is the provision of a continuous coffee extractor wherein the countercurrent flow of water and coffee particles is such that stagnant areas are not formed thereby insuring efficient and highly sanitary operating conditions.

Another object is to provide a conical coffee wetting hopper having a floating ribbon screw therein and an unobstructed conduit for conducting the wetting coffee particles into an extraction zone thereby to insure the complete wetting of said coffee without the formation of dead areas in said hopper.

Other, further and more specific objects of this invention will become readily apparent from a consideration of the following description when taken in conjunction with the accompanying drawings wherein:

Fig. 1 is a longitudinal sectional view of the extractor of the instant invention; and Fig. 2 is an enlarged section taken on line 2—2 in Fig. 1.

As seen in Fig. 1, a preferred form of the apparatus of the instant invention especially suitable for the continuous solvent extraction of coffee includes a feeding hopper 14 which is equipped with a charging inlet 15 through which the substantially uniform size particles are fed. A lixivium outlet 16 is provided in the side of hopper 14 and has a mesh screen 17 which prevents escape of the finely-divided material. A scraper arm 18 engages the inner surface of the screen 17 and upon rotation removes any material adhering thereto, said scraper arm 18 being rotated intermittently or continuously, as desired, by any suitable drive means, such as the motor drive means shown in Figs. 1 and 2 wherein the scraper shaft 19 is rotated by the motor 20 through the chain 21.

The hopper 14 is conical in shape and has a floating conical ribbon screw 22 disposed therein which is rotatably mounted in the upper end plate 23. The screw 22 slidably engages the inside conical wall of the hopper 14 upon rotation by a suitable drive means such as the motor 24 which is operatively connected by a chain 25 to the sprocket wheel 26. The ribbon screw 22 is made up of a metal spiral ribbon 8 which is wound around the floating shaft 9 and spaced therefrom by means of the struts 10.

The smaller end of the relatively short conical hopper 14 is connected by pipe 27 to the lower end of the relatively long tubular chamber 28. As seen in Fig. 1, the chamber 28 has a long floating conveyor 29 which is rotatably mounted at the upper end thereof in the bearing plate 30. A sprocket wheel 31 is connected by the chain 32 to the motor 33 for rotating the conveyor 29. On the underside of the upper end of the chamber 28 is a discharge chute 34 through which the drained material passes after passage through an extraction zone and a drainage zone. A solvent inlet 35 is provided in the top of the upper portion of chamber 28 and a drain connection 36 is provided at the lower end of the chamber.

The floating conveyor 29 has a solid screw 37 at its lower portion and a ribbon screw 38 at its upper portion to subject the finely-divided material to optimum extraction conditions in the lower portion of the chamber while in the upper portion, optimum drainage conditions are provided. In other words, the chamber 28 is divided by the floating conveyor 29 into a lower extraction zone and an upper drainage zone wherein the wetted material received from the hopper 14 is first subjected to solvent extraction during upward movement by the solid screw 37 through more than half the length of the chamber 28, and is then moved through the drainage zone to the discharge chute 34 by the ribbon screw 38 which allows the liquid solvent to separate out and return to the extraction zone.

It will be noted from Fig. 1 that the hopper 14 is inclined upwardly and that the chamber 28 is connected to the hopper 14 in a manner such that it is inclined from the vertical away from the hopper and lies substantially in the same vertical plane.

By this arrangement the forward movement of the finely-divided material is altered but slightly, there being substantially no radical change in the direction of flow during passage from the hopper 14 into the chamber 28.

In carrying out the extraction operation with the apparatus of the present invention, finely-divided material, preferably of uniform particle size, is introduced into the hopper 14 through the charging inlet 15. The solid material is preferably reduced to small particles in order to present a large surface area to the solvent to insure rapid and complete wetting of the material as well as to speed up the extraction operation. It is important that the quantity of exceedingly fine particles or fines included in the finely-divided material be at a minimum to prevent the formation of dry pockets and possible clogging of the apparatus.

The surface tension of the lixivium present in the hopper 14 causes some of the particles of introduced material to float and become extremely difficult to wet. Since the conical feeding hopper 14 is in an upwardly inclined position, however, the lixivium present therein forms a surface which is relatively large and, therefore, is capable of receiving relatively large quantities of material. The rotating conical ribbon screw 22 agitates the mixture of lixivium and finely-divided material and thereby increases the intimate association of the lixivium and the particles resulting in an acceleration of the wetting of the particles. As the particles overcome the surface tension of the lixivium, capillary attraction causes the particles to become completely wetted. Due to their wetness and their increased weight, the particles then gravitate downwardly into the path of the metal spiral ribbon 8 of the conical ribbon screw 22 where they are moved downwardly and forwardly into the chamber 28. It will be seen, therefore, that the relatively large wetting surface of lixivium accommodates a substantial number of particles of finely-divided material which, due to the ribbon construction of the conical screw 22 are allowed to float on the surface until each of them has overcome the surface tension of the lixivium. In this manner the possibility of a large quantity of dry material being forced through the chamber 28 is avoided and the efficient solvent extraction of the material is assured.

Upon leaving the wetting zone in hopper 14 the material is moved upwardly through the chamber 28 by the solid screw 37. Solvent introduced through the inlet 35 flows downwardly and countercurrently to the material and removes the soluble constituents therefrom. After the material has been moved through the solvent in the extraction zone by the solid screw 37, it is acted on by the ribbon screw 38 which moves it upwardly through the drainage zone where the solvent is drained from the material and allowed to return to the extraction zone. To facilitate complete drainage, pusher paddles may be mounted on the ribbon screw 38 at various angles to increase the agitation of the material. The material then passes through the discharge chute 34. The lixivium which flows up into the hopper 14 is discharged through the wire screen 17 to the outlet 16.

It may be desirable to operate the present extractor at either high or low temperature conditions depending on the material being used. It is, of course, within the scope of this invention to provide the apparatus with jackets or other suitable means for maintaining the desired temperature by the flow of cooling of heating fluids therethrough. Electric strip heaters have also been found to be highly satisfactory. In the extraction of coffee by the apparatus of the present invention it has been found desirable to use heated water and to maintain the heated condition of the water during its travel through the extractor by suitable heating means.

We claim:

1. In an apparatus for the continuous countercurrent extraction of finely-divided material, a relatively long upwardly inclined tubular chamber having in its upper portion means for discharging said material therefrom and means for introducing solvent therein, a floating conveyor rotatably connected to the upper end of said chamber and extending downwardly therethrough, said conveyor being in the form of a solid screw at its lower portion and a ribbon screw at its upper portion; a relatively short conical feeding hopper connected at its smaller end to the lower end of said chamber and having means for discharging the resultant lixivium in a manner such that the solvent level in said chamber is maintained substantially at the level of the upper end of said solid screw thereby providing a lower extracting zone and an upper drainage zone in said chamber; means for flowing the finely-divided material onto the surface of said lixivium; and a conical floating ribbon screw rotatably connected to the upper end of said chamber for moving said material downwardly into engagement with said floating conveyor, said conical feeding hopper being inclined from the vertical away from said chamber in the same vertical plane therewith to provide a surface area of said lixivium sufficiently large to insure the complete wetting of the finely-divided material prior to any substantial movement downwardly through said hopper.

2. In an apparatus in accordance with claim 1 wherein said means for discharging the resultant lixivium includes a lixivium outlet, a screen mounted in said outlet, and a movable scraper arm for removing finely-divided material from the inner surface of said screen.

3. In an apparatus for the continuous countercurrent extraction of finely-divided material, a relatively long upwardly inclined tubular chamber having its upper portion means for discharging said material therefrom and means for introducing solvent therein, a floating conveyor rotatably connected to the upper end of said chamber and extending downwardly therethrough, said conveyor being in the form of a solid screw at its lower portion and a ribbon screw at its upper portion; a relatively short conical feeding hopper connected at its smaller end to the lower end of said chamber immediately over the lower free end of said floating conveyor and inclined from the vertical away from said chamber in the same vertical plane therewith to allow unobstructed movement of said material therethrough without radical changes in direction, said feeding hopper having means for discharging the resultant lixivium in a manner such that the solvent level in said chamber is maintained substantially at the level of the upper end of said solid screw thereby providing a lower extracting zone and an upper drainage zone in said chamber, means for flowing the finely-divided material onto the surface of said lixivium, and a conical floating ribbon screw rotatably connected to the upper end of said chamber for moving said material downwardly into engagement with said floating conveyor, the lower free end of said conical floating ribbon screw being positioned at said smaller end of said feeding hopper immediately over said lower free end of said floating conveyor to prevent the existence of stagnant areas and thereby insure complete and sanitary movement of said finely-divided material.

4. In an apparatus in accordance with claim 3 wherein said means for discharging the resultant lixivium includes a lixivium outlet, a screen mounted in said outlet, and a movable scraper arm for removing finely-divided material from the inner surface of said screen.

5. In an apparatus for the continuous countercurrent extraction of finely-divided material, a relatively long upwardly inclined tubular chamber having a discharge chute on the underside of its upper end for discharging said material therefrom, a solvent inlet in its upper portion for introducing solvent therein, and a bearing plate attached to its upper end, a floating conveyor rotatably mounted in said bearing plate and extending downwardly through said chamber, said conveyor being in the form of a solid screw at its lower portion and a ribbon screw at its upper portion; a relatively short conical feeding hopper connected at its smaller end to the lower end of said chamber, said feeding hopper having means for discharging the resultant lixivium in a manner such that the solvent level in said chamber is maintained substantially at the level of the upper end of said solid screw thereby providing a lower extracting zone and an upper drainage zone in said chamber, a charging inlet for flowing the finely-divided material onto the surface of said lixivium, an end plate attached to the upper end of said feeding hopper, and a conical floating ribbon screw rotatably mounted in said end plate and extending downwardly through said feeding hopper for moving said material downwardly into engagement with said floating conveyor, said conical feeding hopper being inclined from the vertical away from said chamber in the same vertical plane therewith to provide a surface area of said lixivium sufficiently large to insure complete wetting of the finely-divided material prior to any substantial movement downwardly through said hopper.

6. In an apparatus in accordance with claim 5 wherein said means for discharging the resultant lixivium includes a lixivium outlet, a screen mounted in said outlet, and a movable scraper arm for removing finely-divided material from the inner surface of said screen.

EARL W. FLOSDORF.
EDWARD C. DISTLER.

REFERENCES CITED

The following references are of record in the file of this patent:

UNITED STATES PATENTS

| Number | Name | Date |
| --- | --- | --- |
| 1,081,949 | Dupont | Dec. 23, 1913 |
| 1,793,465 | Coachran | Feb. 24, 1931 |
| 2,083,293 | Champlin | June 8, 1937 |
| 2,183,837 | Hamilton | Dec. 19, 1939 |
| 2,381,965 | Berry | Aug. 14, 1945 |
| 2,427,388 | Curran | Sept. 16, 1947 |
| 2,517,073 | Alvarez | Aug. 1, 1950 |

FOREIGN PATENTS

| Number | Country | Date |
| --- | --- | --- |
| 358,608 | Germany | Sept. 12, 1922 |
| 529,311 | Great Britain | Nov. 19, 1940 |